US010839598B2

(12) United States Patent
Zeng et al.

(10) Patent No.: US 10,839,598 B2
(45) Date of Patent: Nov. 17, 2020

(54) INDEXING VOXELS FOR 3D PRINTING

(71) Applicant: Hewlett-Packard Development Company, L.P., Houston, TX (US)

(72) Inventors: Jun Zeng, Palo Alto, CA (US); Ana Del Angel, Guadalajara (MX); Scott White, Boise, ID (US); Sebastia Cortes i Herms, Sant Cugat del Valles (ES); Gary Dispoto, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/302,962

(22) PCT Filed: Jul. 26, 2016

(86) PCT No.: PCT/US2016/043996
§ 371 (c)(1),
(2) Date: Nov. 19, 2018

(87) PCT Pub. No.: WO2018/022011
PCT Pub. Date: Feb. 1, 2018

(65) Prior Publication Data
US 2019/0122427 A1  Apr. 25, 2019

(51) Int. Cl.
*G06T 17/00* (2006.01)
*B33Y 50/00* (2015.01)
(Continued)

(52) U.S. Cl.
CPC .......... *G06T 17/005* (2013.01); *B29C 64/386* (2017.08); *B33Y 50/00* (2014.12);
(Continued)

(58) Field of Classification Search
CPC ......... G06T 17/00; G06T 15/00; G06T 15/08; G06T 17/05; G06T 17/10; G06T 17/30;
(Continued)

(56) References Cited

U.S. PATENT DOCUMENTS 4,694,404 A * 9/1987 Meagher ................... G06T 9/40
345/421
5,136,686 A * 8/1992 Koza ..................... G06N 3/126
706/13
(Continued)

FOREIGN PATENT DOCUMENTS

CN        103903061 A   7/2014
EP         1574996 A2   9/2005

OTHER PUBLICATIONS

Bennett J., Voxel Octree Intersection Based 3D Scanning, 2008.

*Primary Examiner* — Charles L Beard
(74) *Attorney, Agent, or Firm* — Dicke Billig & Czaja PLLC

(57) ABSTRACT

One example includes a non-transitory machine readable storage medium including voxels organized by an octree and at least one quad-tree index. The octree defines an object to be three-dimensionally printed and includes a list of nodes for each depth of the octree where each node includes nodal content representing at least one voxel. The at least one quad-tree index is to index at least one node of the octree and has a depth less than or equal to a maximum resolved depth. The at least one quad-tree index is to be accessed by computer executable instructions to retrieve nodal content from the octree to control a processor to process the object to be three-dimensionally printed.

18 Claims, 10 Drawing Sheets

(51) Int. Cl.
*G06T 9/40* (2006.01)
*G06T 19/20* (2011.01)
*B29C 64/386* (2017.01)
*G06F 16/901* (2019.01)

(52) U.S. Cl.
CPC ............ *G06F 16/9027* (2019.01); *G06T 9/40* (2013.01); *G06T 19/20* (2013.01)

(58) Field of Classification Search
CPC . G06T 2219/008; G06T 17/005; G06T 13/20; G06T 15/04; G06T 15/06; G06T 15/10; G06T 15/20; G06T 15/205; G06T 9/40; G06T 19/20; B33Y 50/00; B29C 64/386; G06F 16/9027
See application file for complete search history.

(56) References Cited

U.S. PATENT DOCUMENTS

| | | | | |
|---|---|---|---|---|
| 5,404,525 A * | 4/1995 | Endicott | | G06F 8/71 717/108 |
| 5,511,190 A * | 4/1996 | Sharma | | G06F 16/24556 |
| 5,600,763 A * | 2/1997 | Greene | | G06T 15/06 345/420 |
| 5,634,087 A * | 5/1997 | Mammone | | G06N 3/063 706/25 |
| 5,651,099 A * | 7/1997 | Konsella | | G06N 3/126 706/13 |
| 5,742,738 A * | 4/1998 | Koza | | G06N 3/126 706/13 |
| 5,764,521 A * | 6/1998 | Batchelder | | B29C 41/36 700/196 |
| 5,805,098 A * | 9/1998 | McCorkle | | G01S 13/904 342/25 F |
| 5,819,255 A * | 10/1998 | Celis | | G06F 16/24542 |
| 5,822,747 A * | 10/1998 | Graefe | | G06F 16/24542 |
| 5,968,109 A * | 10/1999 | Israni | | G01C 21/32 701/532 |
| 5,999,187 A * | 12/1999 | Dehmlow | | G06T 19/003 345/420 |
| 6,014,614 A * | 1/2000 | Herring | | G06K 9/00476 702/196 |
| 6,021,405 A * | 2/2000 | Celis | | G06F 16/24542 |
| 6,029,173 A * | 2/2000 | Meek | | G01C 21/32 707/696 |
| 6,223,182 B1 * | 4/2001 | Agarwal | | G06F 16/284 |
| 6,223,183 B1 * | 4/2001 | Smith | | G06F 16/5838 |
| 6,336,106 B1 * | 1/2002 | Evans | | G06N 5/025 706/12 |
| 6,339,772 B1 * | 1/2002 | Klein | | G06F 16/24568 707/704 |
| 6,356,902 B1 * | 3/2002 | Tan | | G06F 16/40 |
| 6,389,074 B1 * | 5/2002 | Andrew | | H04N 19/619 375/240.05 |
| 6,396,492 B1 * | 5/2002 | Frisken | | G06T 17/00 345/420 |
| 6,429,864 B1 * | 8/2002 | Schwarzer | | G06T 15/06 345/419 |
| 6,539,519 B1 * | 3/2003 | Meeker | | G06F 17/5081 716/102 |
| 6,583,787 B1 * | 6/2003 | Pfister | | G06T 15/005 345/441 |
| 6,597,359 B1 * | 7/2003 | Lathrop | | G06T 15/06 345/420 |
| 6,715,148 B1 * | 3/2004 | Endicott | | G06F 9/4488 719/316 |
| 6,879,980 B1 * | 4/2005 | Kothuri | | G06F 16/2264 707/765 |
| 7,174,331 B1 * | 2/2007 | Luo | | G06F 16/2343 |
| 7,219,091 B1 * | 5/2007 | Bruno | | G06F 16/8373 |
| 7,317,825 B2 * | 1/2008 | Yang | | G06T 15/08 345/420 |
| 7,333,107 B2 * | 2/2008 | Papageorgiou | | G06T 15/08 345/424 |
| 7,349,869 B2 * | 3/2008 | Oakeson | | G06Q 10/10 705/26.5 |
| 7,424,461 B2 * | 9/2008 | Kirshenbaum | | G06N 3/126 706/13 |
| 7,426,455 B1 * | 9/2008 | Antony | | G06F 17/10 345/443 |
| 7,439,970 B1 * | 10/2008 | Clarke | | G06T 15/10 345/419 |
| 7,451,144 B1 * | 11/2008 | Koudas | | G06F 16/83 |
| 7,656,543 B2 * | 2/2010 | Atkins | | H04N 1/00132 358/1.13 |
| 7,773,087 B2 * | 8/2010 | Fowler | | G06T 15/06 345/426 |
| 7,804,498 B1 * | 9/2010 | Graham | | G06T 11/206 345/419 |
| 7,991,779 B1 * | 8/2011 | Drory | | G06F 16/29 707/743 |
| 8,049,752 B2 * | 11/2011 | Yang | | G06T 15/08 345/424 |
| 8,229,970 B2 * | 7/2012 | Walters | | G06F 16/322 707/802 |
| 8,578,267 B2 * | 11/2013 | Atkins | | G06T 11/206 715/243 |
| 8,818,544 B2 * | 8/2014 | Nehme | | G06T 30/00 700/119 |
| 8,856,184 B1 * | 10/2014 | Udeshi | | G06F 7/00 707/797 |
| 8,862,986 B2 * | 10/2014 | Atkins | | G06F 9/451 715/243 |
| 9,111,385 B2 * | 8/2015 | Kho | | G06T 15/08 |
| 9,280,616 B2 * | 3/2016 | Cudak | | B33Y 50/02 |
| 9,483,588 B2 * | 11/2016 | Nehme | | B29C 64/393 |
| 9,501,298 B2 * | 11/2016 | Ramaiah Nanjundaiah | | G06F 9/445 |
| 9,508,152 B2 * | 11/2016 | Yoo | | G06K 9/6282 |
| 9,576,112 B1 * | 2/2017 | Mishra | | G06F 3/047 |
| 9,652,883 B2 * | 5/2017 | Buyanovskiy | | G06T 15/08 |
| 9,754,405 B1 * | 9/2017 | Young | | G06T 17/005 |
| 9,798,808 B2 * | 10/2017 | Blaas | | G06F 16/951 |
| 9,842,424 B2 * | 12/2017 | Hecht | | G06T 15/50 |
| 9,865,085 B1 * | 1/2018 | Eng | | G06T 19/00 |
| 9,977,806 B2 * | 5/2018 | Shim | | G06F 16/2246 |
| 10,043,306 B2 * | 8/2018 | Isomaki | | G06T 15/405 |
| 10,089,416 B1 * | 10/2018 | DuBose | | G05B 15/02 |
| 10,105,905 B1 * | 10/2018 | Sweet | | B29C 64/386 |
| 10,140,324 B2 * | 11/2018 | Massarella | | G06F 16/2246 |
| 10,163,215 B2 * | 12/2018 | Yoo | | G06K 9/6282 |
| 10,181,216 B2 * | 1/2019 | Zeng | | G06T 17/00 |
| 10,225,438 B2 * | 3/2019 | Morovic | | G06K 15/18 |
| 10,343,335 B2 * | 7/2019 | Morovic | | B29C 64/393 |
| 10,373,371 B2 * | 8/2019 | Zeng | | B33Y 30/00 |
| 10,406,801 B2 * | 9/2019 | Bell | | B33Y 40/00 |
| 10,434,716 B2 * | 10/2019 | Morovic | | B33Y 50/02 |
| 10,442,135 B2 * | 10/2019 | Morovic | | G06F 30/20 |
| 10,500,790 B2 * | 12/2019 | Morovic | | G05B 19/4099 |
| 10,529,126 B2 * | 1/2020 | Zeng | | G06T 17/00 |
| 10,534,875 B2 * | 1/2020 | Arisoy | | B33Y 50/00 |
| 10,560,608 B2 * | 2/2020 | Morovic | | G06F 3/122 |
| 10,589,509 B2 * | 3/2020 | Carruesco Llorens | | B33Y 50/02 |
| 10,661,506 B2 * | 5/2020 | Garcia Reyero Vinas | | B29C 64/393 |
| 10,678,217 B2 * | 6/2020 | Zeng | | G06T 17/00 |
| 10,703,083 B2 * | 7/2020 | Meess | | G05B 19/402 |
| 2002/0000986 A1 * | 1/2002 | Sowizral | | G06T 15/10 345/421 |
| 2002/0027563 A1 * | 3/2002 | Van Doan | | G06T 11/60 345/630 |
| 2002/0075260 A1 * | 6/2002 | Brokenshire | | G06T 17/005 345/420 |
| 2002/0151315 A1 * | 10/2002 | Hendrey | | H04W 64/00 455/466 |
| 2003/0193527 A1 * | 10/2003 | Pharr | | G06T 1/60 715/853 |
| 2003/0197698 A1 | 10/2003 | Perry et al. | | |

(56) References Cited

U.S. PATENT DOCUMENTS

| | | | |
|---|---|---|---|
| 2003/0227455 A1* | 12/2003 | Lake | G06T 17/005 345/421 |
| 2004/0061726 A1* | 4/2004 | Dunn | G06T 17/05 715/855 |
| 2004/0111388 A1* | 6/2004 | Boiscuvier | G06F 16/80 |
| 2005/0028122 A1* | 2/2005 | Fallon | G06F 17/5072 716/122 |
| 2005/0035883 A1* | 2/2005 | Kameda | G01C 21/3638 340/995.1 |
| 2005/0131917 A1* | 6/2005 | Auerbach | G06F 16/2246 |
| 2005/0180340 A1* | 8/2005 | Lee | G06T 9/40 370/258 |
| 2005/0195191 A1* | 9/2005 | Lee | G06T 9/40 345/424 |
| 2006/0066607 A1* | 3/2006 | Schmittler | G06T 15/06 345/419 |
| 2006/0106832 A1* | 5/2006 | Ben-Dyke | G06F 16/2246 |
| 2006/0146053 A1* | 7/2006 | Gatewood, Jr. | G06T 19/00 345/440 |
| 2006/0167865 A1* | 7/2006 | Andrei | G06F 16/24544 |
| 2006/0259856 A1* | 11/2006 | Atkins | G06T 11/60 715/235 |
| 2006/0259857 A1* | 11/2006 | Atkins | G06T 11/60 715/235 |
| 2006/0268297 A1* | 11/2006 | Han | H04N 1/6019 358/1.9 |
| 2006/0274065 A1* | 12/2006 | Buyanovskiy | G06T 15/83 345/424 |
| 2007/0040833 A1* | 2/2007 | Buyanovski | G06T 15/06 345/426 |
| 2007/0146734 A1* | 6/2007 | Taniuchi | B33Y 30/00 358/1.1 |
| 2007/0206006 A1* | 9/2007 | Lee | G06T 17/005 345/420 |
| 2008/0049017 A1* | 2/2008 | Shearer | G06T 15/06 345/421 |
| 2008/0074416 A1* | 3/2008 | Brown | G06T 1/60 345/420 |
| 2008/0074417 A1* | 3/2008 | Mejdrich | G06T 15/06 345/420 |
| 2008/0079731 A1* | 4/2008 | Shearer | G06T 15/40 345/473 |
| 2008/0082912 A1* | 4/2008 | Atkins | G06T 11/206 715/243 |
| 2008/0091691 A1* | 4/2008 | Tsuji | G06F 16/284 |
| 2008/0192044 A1* | 8/2008 | Fowler | G06T 15/06 345/419 |
| 2008/0192046 A1* | 8/2008 | Fowler | G06T 19/00 345/419 |
| 2008/0192051 A1* | 8/2008 | Fowler | G06T 15/40 345/421 |
| 2008/0215520 A1* | 9/2008 | Gu | G06F 16/81 706/48 |
| 2008/0231627 A1* | 9/2008 | Shearer | A63F 13/10 345/419 |
| 2008/0238919 A1* | 10/2008 | Pack | G06T 15/04 345/420 |
| 2008/0312954 A1* | 12/2008 | Ullrich | G06Q 10/10 705/2 |
| 2009/0049452 A1* | 2/2009 | Kriegel | G06F 9/546 719/313 |
| 2009/0073167 A1* | 3/2009 | Brown | G06T 15/06 345/421 |
| 2009/0153556 A1* | 6/2009 | Nam | G06T 15/06 345/421 |
| 2009/0182837 A1* | 7/2009 | Rogers | G06F 16/9027 709/215 |
| 2009/0184961 A1* | 7/2009 | Hayashi | G01B 11/24 345/424 |
| 2009/0323833 A1* | 12/2009 | Karayil Thekkoott Narayanan | H04B 1/0003 375/259 |
| 2010/0053162 A1* | 3/2010 | Dammertz | G06T 15/06 345/426 |
| 2010/0060637 A1* | 3/2010 | Shearer | G06T 15/06 345/426 |
| 2010/0082703 A1* | 4/2010 | Zhou | G06F 16/9027 707/803 |
| 2010/0085352 A1* | 4/2010 | Zhou | G06T 17/005 345/419 |
| 2010/0085353 A1* | 4/2010 | Zhou | G06T 17/00 345/419 |
| 2010/0095064 A1* | 4/2010 | Aviles | H04L 67/1097 711/118 |
| 2010/0188396 A1* | 7/2010 | Mejdrich | G06T 15/06 345/419 |
| 2010/0188403 A1* | 7/2010 | Mejdrich | G06T 15/06 345/426 |
| 2010/0194766 A1* | 8/2010 | Nakagawa | G06T 17/005 345/543 |
| 2010/0205181 A1* | 8/2010 | Chidlovskii | G06F 16/29 707/741 |
| 2010/0239186 A1* | 9/2010 | Fowler | G06T 15/06 382/291 |
| 2010/0250617 A1* | 9/2010 | Aihara | G06F 16/58 707/802 |
| 2011/0026600 A1* | 2/2011 | Kenji | H04N 19/70 375/240.24 |
| 2011/0026611 A1* | 2/2011 | Kenji | H04N 19/172 375/240.29 |
| 2011/0087350 A1* | 4/2011 | Fogel | G06F 17/50 700/98 |
| 2011/0134920 A1* | 6/2011 | Dyke | H04L 45/60 370/392 |
| 2011/0184969 A1* | 7/2011 | Idicula | G06F 16/8373 707/760 |
| 2011/0283086 A1* | 11/2011 | Mejdrich | G06F 9/3802 712/30 |
| 2011/0285710 A1* | 11/2011 | Mejdrich | G06T 15/06 345/426 |
| 2011/0316854 A1* | 12/2011 | Vandrovec | G06T 17/005 345/420 |
| 2011/0316855 A1* | 12/2011 | Mejdrich | G06T 15/06 345/420 |
| 2012/0046861 A1* | 2/2012 | Feldbauer | G09B 29/106 701/426 |
| 2012/0050289 A1* | 3/2012 | Park | G06T 15/06 345/426 |
| 2012/0136575 A1* | 5/2012 | Samet | G01C 21/3446 701/540 |
| 2012/0166440 A1* | 6/2012 | Shmueli | G06F 16/322 707/737 |
| 2012/0230421 A1* | 9/2012 | Chen | H04N 19/176 375/240.18 |
| 2012/0303611 A1* | 11/2012 | Kusumura | G06F 16/355 707/722 |
| 2012/0331472 A1* | 12/2012 | Moon | G06F 16/29 718/102 |
| 2013/0106852 A1* | 5/2013 | Woodhouse | G06T 17/20 345/423 |
| 2013/0135347 A1* | 5/2013 | Inada | G09G 5/395 345/629 |
| 2013/0207967 A1* | 8/2013 | Park | G06T 15/06 345/419 |
| 2013/0272621 A1* | 10/2013 | Lasserre | G06T 9/00 382/233 |
| 2013/0297062 A1* | 11/2013 | Lacaze | B29C 64/112 700/119 |
| 2013/0301942 A1* | 11/2013 | Kondo | H04N 19/117 382/233 |
| 2013/0325903 A1* | 12/2013 | Rohlf | G06T 17/05 707/797 |
| 2014/0003496 A1* | 1/2014 | Kondow | H04N 19/117 375/240.02 |
| 2014/0006411 A1* | 1/2014 | Boldyrev | G06F 16/2264 707/741 |
| 2014/0031967 A1* | 1/2014 | Unger | B33Y 50/00 700/119 |

(56) References Cited

U.S. PATENT DOCUMENTS

| | | | |
|---|---|---|---|
| 2014/0181573 A1* | 6/2014 | Goss | G06F 13/40 714/5.11 |
| 2014/0185669 A1* | 7/2014 | Zhang | H04N 19/503 375/240.12 |
| 2014/0201838 A1* | 7/2014 | Varsanyi | G06F 21/552 726/23 |
| 2014/0244422 A1* | 8/2014 | Giannetti | G06Q 30/0621 705/26.5 |
| 2014/0285488 A1* | 9/2014 | Sevastiyanov | G06T 15/06 345/426 |
| 2014/0324204 A1* | 10/2014 | Vidimce | B29C 67/0088 700/98 |
| 2014/0368504 A1* | 12/2014 | Chen | G06T 17/005 345/424 |
| 2015/0001762 A1* | 1/2015 | Lacaze | B29C 64/386 264/308 |
| 2015/0023557 A1* | 1/2015 | Yoo | G06K 9/6282 382/103 |
| 2015/0105891 A1* | 4/2015 | Golway | B29C 64/106 700/98 |
| 2015/0123968 A1* | 5/2015 | Holverda | G06K 9/4604 345/422 |
| 2015/0130795 A1* | 5/2015 | Chhugani | G06T 19/20 345/419 |
| 2015/0134096 A1* | 5/2015 | Travers | B29C 64/147 700/98 |
| 2015/0161154 A1* | 6/2015 | Gheith | G06F 3/0608 707/705 |
| 2015/0170396 A1* | 6/2015 | Kornmann | G06T 15/005 345/419 |
| 2015/0199383 A1* | 7/2015 | Roimela | G06F 16/29 707/741 |
| 2015/0213125 A1* | 7/2015 | Shim | G06F 16/2246 707/741 |
| 2015/0262416 A1* | 9/2015 | Hecht | G06T 15/08 345/424 |
| 2015/0269773 A1* | 9/2015 | Pearson | G06T 17/005 345/420 |
| 2015/0279071 A1* | 10/2015 | Xin | G06T 1/60 345/440 |
| 2015/0279092 A1* | 10/2015 | Ganestam | G06T 17/005 345/419 |
| 2015/0293722 A1* | 10/2015 | Cudak | G05B 19/4099 358/1.15 |
| 2015/0310642 A1* | 10/2015 | Kruglick | H04N 21/235 345/441 |
| 2016/0005210 A1* | 1/2016 | Borodavka | G06T 15/06 345/419 |
| 2016/0019319 A1* | 1/2016 | Shtilerman | G05B 19/4099 264/308 |
| 2016/0071313 A1* | 3/2016 | Laine | G06T 15/10 345/419 |
| 2016/0078074 A1* | 3/2016 | Korzunov | G06F 16/185 707/743 |
| 2016/0101570 A1* | 4/2016 | Iorio | G05B 19/4099 700/98 |
| 2016/0110910 A1* | 4/2016 | Obert | G06T 15/005 345/426 |
| 2016/0140153 A1* | 5/2016 | Massarella | G06F 16/2246 707/743 |
| 2016/0170896 A1* | 6/2016 | Steiss | G06F 12/109 711/154 |
| 2016/0179891 A1* | 6/2016 | Bowman | G06F 16/9027 707/720 |
| 2016/0189419 A1* | 6/2016 | Fakih | G06T 17/005 345/419 |
| 2016/0240003 A1* | 8/2016 | Frayne | G06T 11/00 |
| 2016/0271379 A1* | 9/2016 | Pouliot | A61N 7/022 |
| 2016/0275719 A1* | 9/2016 | Oke | G06T 17/005 |
| 2016/0292041 A1* | 10/2016 | Bender | G06F 11/1448 |
| 2016/0292908 A1* | 10/2016 | Obert | G06T 1/20 |
| 2016/0295219 A1* | 10/2016 | Ye | G06T 9/40 |
| 2016/0314611 A1* | 10/2016 | Shin | G06T 15/06 |
| 2016/0321255 A1* | 11/2016 | Granacher | G06F 16/2246 |
| 2016/0371339 A1* | 12/2016 | Paddon | G06F 16/2425 |
| 2016/0371391 A1* | 12/2016 | Brown | G06F 16/8365 |
| 2017/0039720 A1* | 2/2017 | Yoo | G06K 9/6282 |
| 2017/0039759 A1* | 2/2017 | Huet | G06T 9/001 |
| 2017/0116780 A1* | 4/2017 | Han | G06T 17/20 |
| 2017/0161944 A1* | 6/2017 | Deshwal | G06T 17/005 |
| 2017/0169544 A1* | 6/2017 | Boulkenafed | G06T 3/4038 |
| 2017/0206231 A1* | 7/2017 | Binder | G06T 15/005 |
| 2017/0214821 A1* | 7/2017 | Morovic | H04N 1/644 |
| 2017/0249779 A1* | 8/2017 | Obert | G06T 15/80 |
| 2017/0249782 A1* | 8/2017 | Zeng | G06T 17/00 |
| 2017/0270146 A1* | 9/2017 | Harrison | G06F 7/14 |
| 2017/0303106 A1* | 10/2017 | Kannan | H04W 4/90 |
| 2017/0336777 A1* | 11/2017 | Koh | G05B 19/4099 |
| 2017/0361536 A1* | 12/2017 | Garcia Reyero Vinas | G06T 17/005 |
| 2017/0365090 A1* | 12/2017 | Hazel | G06T 15/40 |
| 2017/0367766 A1* | 12/2017 | Mahfouz | A61B 34/10 |
| 2017/0372480 A1* | 12/2017 | Anand | G06T 30/20 |
| 2017/0372513 A1* | 12/2017 | Zeng | G06T 19/00 |
| 2018/0025545 A1* | 1/2018 | Tai | G06T 13/40 345/419 |
| 2018/0028335 A1* | 2/2018 | Kreeger | G06T 1/60 |
| 2018/0032060 A1* | 2/2018 | Zeng | G05B 19/4099 |
| 2018/0033193 A1* | 2/2018 | Goel | G06F 3/1256 |
| 2018/0117897 A1* | 5/2018 | Zeng | B33Y 50/02 |
| 2018/0130249 A1* | 5/2018 | Shin | G06T 1/20 |
| 2018/0130253 A1* | 5/2018 | Hazel | G06T 15/005 |
| 2018/0133972 A1* | 5/2018 | Morovic | G05B 19/4099 |
| 2018/0162062 A1* | 6/2018 | Mark | B29C 64/165 |
| 2018/0174353 A1* | 6/2018 | Shin | G06T 15/06 |
| 2018/0200965 A1* | 7/2018 | Meess | B29C 64/386 |
| 2018/0205552 A1* | 7/2018 | Struttmann | G06F 21/78 |
| 2018/0229446 A1* | 8/2018 | Bastian | G06F 30/00 |
| 2018/0241668 A1* | 8/2018 | Han | H04L 45/74 |
| 2018/0316827 A1* | 11/2018 | Morovic | H04N 1/41 |
| 2018/0350044 A1* | 12/2018 | Ponto | G06T 5/007 |
| 2019/0011583 A1* | 1/2019 | Ray | G01V 1/282 |
| 2019/0019326 A1* | 1/2019 | Clark | G06T 15/06 |
| 2019/0035138 A1* | 1/2019 | Fuetterling | G06T 15/06 |
| 2019/0035139 A1* | 1/2019 | Zimmerman | G06T 15/06 |
| 2019/0039368 A1* | 2/2019 | Zeng | B29C 64/386 |
| 2019/0057539 A1* | 2/2019 | Stanard | G06T 1/20 |
| 2019/0057545 A1* | 2/2019 | Varekamp | G06T 17/20 |
| 2019/0084694 A1* | 3/2019 | Lacaze | B64F 5/10 |
| 2019/0088002 A1* | 3/2019 | Howson | G06T 15/005 |
| 2019/0114829 A1* | 4/2019 | Abello Rosello | G06T 17/005 |
| 2019/0122385 A1* | 4/2019 | Yoo | G06K 9/6282 |
| 2019/0122427 A1* | 4/2019 | Zeng | B29C 64/386 |
| 2019/0130630 A1* | 5/2019 | Ackerson | G06T 9/40 |
| 2019/0132213 A1* | 5/2019 | Na | H04L 41/145 |
| 2019/0139403 A1* | 5/2019 | Alam | G08G 1/0141 |
| 2019/0152155 A1* | 5/2019 | Gonzalez | B29C 64/165 |
| 2019/0156550 A1* | 5/2019 | Stanard | G06T 15/06 |
| 2019/0179933 A1* | 6/2019 | Wang | G06F 16/2272 |
| 2019/0180499 A1* | 6/2019 | Caulfield | G06T 19/006 |
| 2019/0197767 A1* | 6/2019 | Lin | G06T 17/005 |
| 2019/0220453 A1* | 7/2019 | Douglas | G06F 16/2237 |
| 2019/0270252 A1* | 9/2019 | Iorio | G05B 19/4099 |
| 2019/0272255 A1* | 9/2019 | Gheith | G06F 3/061 |
| 2019/0272256 A1* | 9/2019 | Gheith | G06F 16/13 |
| 2019/0279417 A1* | 9/2019 | Castaneda | G06T 15/20 |
| 2019/0281290 A1* | 9/2019 | Lee | H04N 19/11 |
| 2019/0286758 A1* | 9/2019 | Buffa | G06F 16/2246 |
| 2019/0287023 A1* | 9/2019 | Kasahara | G06F 12/0223 |
| 2019/0306526 A1* | 10/2019 | Cho | H04N 19/176 |
| 2019/0327476 A1* | 10/2019 | Lee | H04N 19/122 |
| 2019/0355166 A1* | 11/2019 | Clark | G06T 15/06 |
| 2019/0362543 A1* | 11/2019 | Zeng | G06T 17/00 |
| 2019/0381739 A1* | 12/2019 | Chen | B33Y 30/00 |
| 2020/0019589 A1* | 1/2020 | Dykema | G06F 40/103 |
| 2020/0028857 A1* | 1/2020 | Warmenhoven | H04L 63/1425 |
| 2020/0042863 A1* | 2/2020 | Wang | G06F 1/20 |
| 2020/0050119 A1* | 2/2020 | Shores | B33Y 10/00 |

(56) References Cited

U.S. PATENT DOCUMENTS

2020/0050175 A1* 2/2020 Carruesco Llorens ...................... G06T 15/08
2020/0052886 A1* 2/2020 Buldas .................. H04L 9/3239

* cited by examiner

INDEXING VOXELS FOR 3D PRINTING

BACKGROUND

Printing technologies may be used to create three-dimensional objects from data output from a computerized modeling source. For example, a three-dimensional object may be designed using a computer program (e.g., a computer aided design (CAD) application), and the computer may output the data of the design to a printing system capable of forming the solid three-dimensional object. Solid free-form fabrication (or layer manufacturing) may be defined generally as a fabrication technology used to build a three-dimensional object using layer by layer or point-by-point fabrication. With this fabrication process, complex shapes may be formed without the use of a pre-shaped die or mold.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Heterogeneous objects are three-dimensional (3D) objects whose interior volume is composed of different materials (where a void may be considered a distinctive material type) to meet design objectives (e.g., light-weighting, processing compensation). For example, by spatially arranging different materials and empty spaces, a heterogeneous structure may be obtained that has mechanical properties that go beyond those of the base constitutive materials.

One practical means to fabricate heterogeneous objects is 3D printing. Documenting and processing heterogeneous objects (e.g., post-design and pre-print), however, may require highly granular knowledge into the make-up of the interior volume of the objects. There is a computing challenge for providing the highly granular 3D description of the object and for accommodating the runtime and storage constraints, particularly in an industrial setting where objects may be large and complex and there is an overall throughput requirement for the factory's profitability.

Accordingly, as disclosed herein, a hierarchical data structure to accelerate the processing (e.g., slicing, compensating the systematic bias due to the physical process of the layered manufacturing) of an object to be 3D printed is described. The data structure includes a set of voxels organized by an octree defining an object to be printed, where each node of the octree represents at least one voxel, and a list of quad-tree indices indexing nodes of the octree to enable each indexed node of the octree to be individually addressable. The quad-tree indices may be resolved to a maximum resolved depth less than or equal to the depth of the octree. The greater the maximum resolved depth, the greater the size of the list of quad-tree indices and the lower the runtime latency when the list of quad-tree indices is accessed to 3D print the object. The lower the maximum resolved depth, the smaller the size of the list of quad-tree indices and the greater the runtime latency when the list of quad-tree indices is accessed to 3D print the object.

Figure 1:
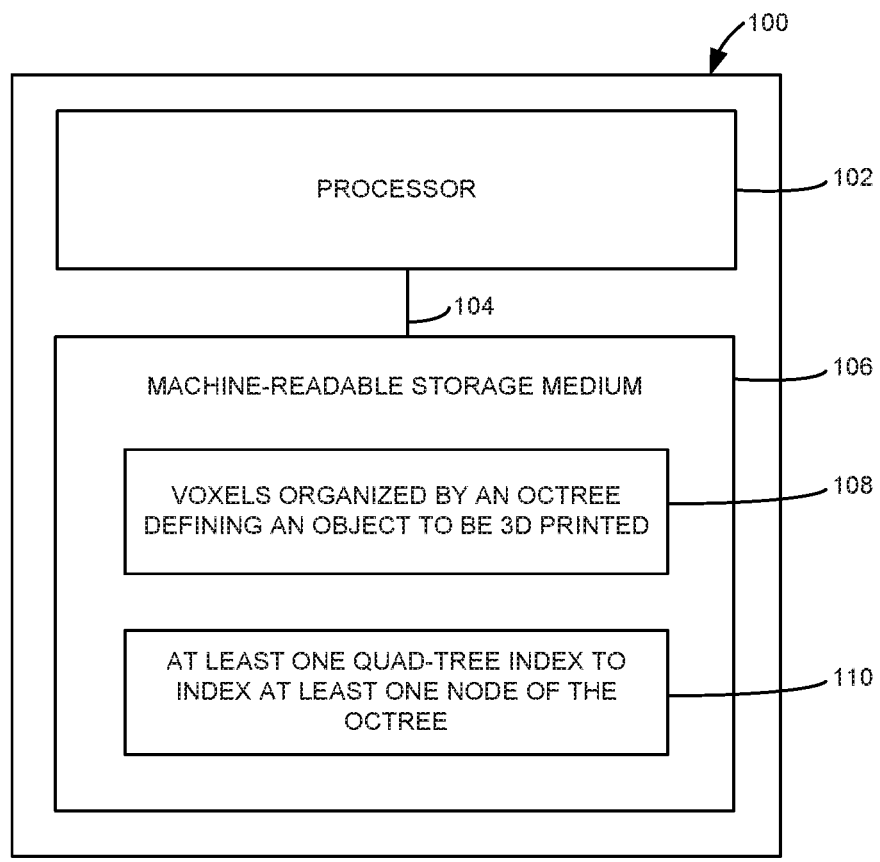
FIG. 1 is a block diagram illustrating one example of a processing system for three-dimensional printing.

FIG. 1 is a block diagram illustrating one example of a processing system 100 for 3D printing. System 100 includes a processor 102 and a machine-readable storage medium 106. Processor 102 is communicatively coupled to machine-readable storage medium 106 through a communication path 104. Although the following description refers to a single processor and a single machine-readable storage medium, the description may also apply to a system with multiple processors and multiple machine-readable storage mediums. In such examples, the instructions and/or data may be distributed (e.g., stored) across multiple machine-readable storage mediums and the instructions and/or data may be distributed (e.g., executed/processed by) across multiple processors.

Processor 102 includes one or more central processing units (CPUs), microprocessors, and/or other suitable hardware devices for retrieval and execution of instructions and/or retrieval and processing of data stored in machine-readable storage medium 106. As will be described in more detail with reference to the following figures, processor 102 may fetch, decode, and execute instructions to create and/or modify data 108 including voxels organized by an octree defining an object to be 3D printed. The octree includes a list of nodes for each depth of the octree, where each node includes nodal content (e.g., material for the node) representing at least one voxel. Collectively, all the voxels form the 3D object. Processor 102 may fetch, decode, and execute instructions to create and/or modify data 110 including at least one quad-tree index to index at least one node of the octree. The at least one indexed node of the octree has a depth less than or equal to a maximum resolved depth, which indicates the resolved depth of the quad-tree index. Processor 102 may fetch, decode, and execute instructions to access the at least one quad-tree index to retrieve nodal content from the octree to process (e.g., slice) the object to be 3D printed.

As will be described in more detail with reference to the following figures, in one example, the at least one quad-tree index includes an ordered list of tuples. Each tuple indexes a corresponding node of the octree and includes a corresponding depth of the octree, an offset indicating the location of the corresponding node in the octree at the corresponding depth, and a non-leaf node flag indicating whether the corresponding node is a non-leaf node (i.e., has children nodes) or a leaf node (i.e., does not have children nodes). The at least one quad-tree index includes a resolved depth of the at least one quad-tree index and a flag indicating whether the nodes indexed by the at least one quad-tree index are fully resolved.

In one example, machine-readable storage medium 106 also includes an index for the at least one quad-tree index. The index includes the depth of the octree, the maximum resolved depth, and an ordered list specifying the at least one quad-tree index and the resolved depth of the at least one quad-tree index. The octree may be a human readable and editable serial data file and the at least one quad-tree index may be a human readable and editable serial data file.

Machine-readable storage medium 106 is a non-transitory storage medium and may be any suitable electronic, magnetic, optical, or other physical storage device that stores executable instructions and/or data. Thus, machine-readable storage medium 106 may be, for example, random access memory (RAM), an electrically-erasable programmable read-only memory (EEPROM), a storage drive, an optical disc, and the like. Machine-readable storage medium 106 may be disposed within system 100, as illustrated in FIG. 1. In this case, the executable instructions and/or data may be installed on system 100. Alternatively, machine-readable storage medium 106 may be a portable, external, or remote storage medium that allows system 100 to download the instructions and/or data from the portable/external/remote storage medium. In this case, the executable instructions and/or data may be part of an installation package.

Figure 2:
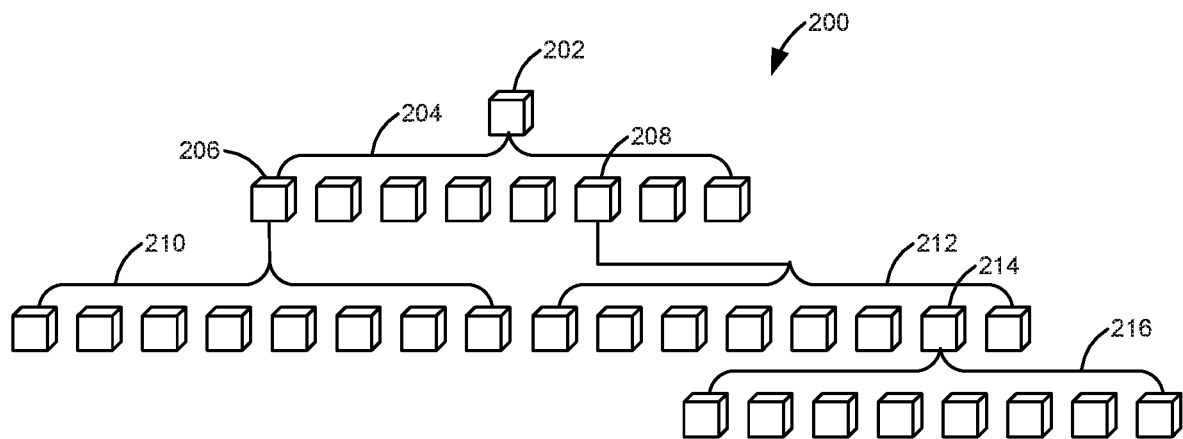
FIG. 2 is a diagram illustrating one example of an octree representation.

FIG. 2 is a diagram illustrating one example of an octree representation 200. An octree is stored in a machine-readable storage medium as a list of a list of nodes. The length of the outer list is the tree depth (e.g., four in the example of FIG. 2). The length of each inner list is the number of nodes in the depth (e.g., one node for depth zero, eight nodes for depth one, 16 nodes for depth two, and eight nodes for depth three in the example of FIG. 2). In octree representation 200, the root or zero depth includes a single non-leaf node 202. Node 202 has eight children nodes 204 at depth one. Of nodes 204 at depth one, nodes 206 and 208 are non-leaf nodes and the remaining nodes are leaf nodes. Node 206 has eight children leaf nodes 210 at depth two. Node 208 has eight children nodes 212 at depth two where node 214 is a non-leaf node and the remaining nodes are leaf nodes. Node 214 has eight children leaf nodes 216 at depth three.

Figure 3A:
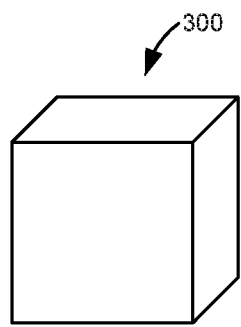
FIGS. 3A-3D are diagrams illustrating each depth of the example octree representation of FIG. 2.
Figure 3B:
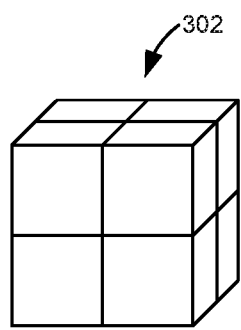

FIGS. 3A-3D are diagrams illustrating each depth of the example octree representation 200 of FIG. 2. FIG. 3A illustrates an object 300 resolved to the root or zero depth of octree representation 200 (i.e., node 202). FIG. 3B illustrates an object 302 resolved to depth one of octree 200 (i.e., nodes 204). At depth one, based on the octree nodal numbering rule, object 302 is divided into eight portions with each portion being defined by a node 204, respectively.

Figure 3C:
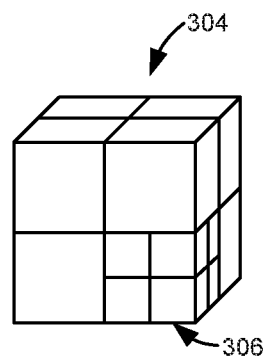

FIG. 3C illustrates an object 304 resolved to depth two of octree representation 200 (i.e., nodes 210 and 212). At depth two, based on the octree nodal numbering rule, two portions (i.e., nodes 206 and 208) of object 304 are further divided into eight portions with each portion being defined by a node 210 and 212, respectively. The eight portions of node 208 are indicated at 306. The eight portions of node 206 are not visible in FIG. 3C.

Figure 3D:
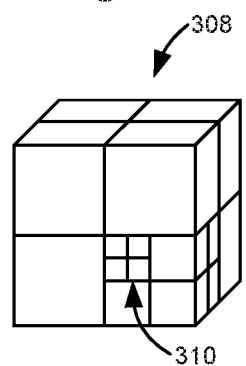

FIG. 3D illustrates an object 308 resolved to depth three of octree representation 200 (i.e., nodes 216). At depth three, based on the octree nodal numbering rule, one portion (i.e., node 214) of object 308 is further divided into eight portions with each portion being defined by a node 216, respectively. The eight portions of node 214 are indicated at 310. Accordingly, any object may be defined by an octree having a depth suitable to represent the object to a desired resolution.

Each node represents at least one voxel. The payload for each leaf node in the octree includes the nodal content for the node, such as the material composition for the node (i.e., which material(s) to be used to form the at least one voxel represented by the node). The payload for each non-leaf node in the octree is the location of the first child node of the non-leaf node in the node list of the next depth. The nodes are stored sequentially one after the other in an octree (OCT) file in a machine-readable storage medium. Accordingly, in the example octree representation 200 of FIG. 2, the nodes are stored in the following order: 202, 204, 210, 212, and 216.

The OCT file includes a header section and a body section. The header section includes the tree depth and the number of nodes for each depth. The body section includes each node. For each non-leaf node, the node includes a non-leaf node (NLN) flag. For each leaf node, the node includes the nodal content for the node. The NLN flag may be a Boolean value indicating the node is a non-leaf node. In one example, the NLN flag is "−1". The nodal content may be a JavaScript object notation (JSON) object, which may be a list (e.g., floating point, material identifier (ID)) of tuples indicating the material composition of the node. If the node is filled by a single material, the size of the list may be one.

In one example, the body section of the OCT file follows two rules: 1) starting from the root depth, there is one line per depth array of the octree; and 2) within the same depth array, each node has seven siblings. The nodes are placed together and sequentially following the octal nodal numbering rule. Accordingly, each 8-node block (e.g., array indices from 8*i to 8*i+7) corresponds to one non-leaf node one line above (e.g., the i<sup>th</sup> non-leaf node in its node array). Below is an example OCT file for octree representation 200 illustrated in FIG. 2.

```
/*header*/
4 /*depth*/
1 8 16 8 /*node count per depth*/
/*body*/
−1 /*root NLN*/
−1 1 2 2 2 −1 2 1 /*depth 1 wherein "1" indicates a first material ID and
         "2"indicates a second material ID*/
1 1 2 2 2 1 1 1 1 1 2 2 1 1 −1 1 /*depth 2*/
1 1 1 2 2 2 2 2 /*depth 3*/
```

The OCT file may be generated by first writing the header including the tree depth and the number of nodes per depth. Next, a loop over the outer list is performed starting from the root depth (i.e., zero depth) and a loop over the inner list is performed. When a non-leaf node is encountered, the NLN flag (e.g., "−1") is written. When a leaf node is encountered, the content of the node (e.g., tuple of material ID and volume faction) is written (e.g., "1" or "2" in the above example). A line break may be inserted after each inner loop to improve readability. Generating the OCT file is efficient since each node is visited a single time for a single read/write operation. No sorting or other computations are involved.

Figure 4A:
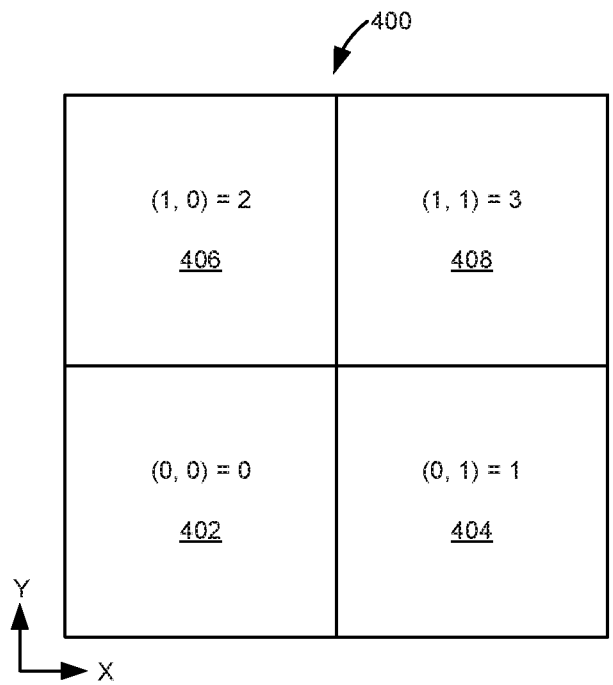
FIG. 4A is a diagram illustrating one example of the quaternary nodal numbering rule.

FIG. 4A is a diagram illustrating one example of the quaternary nodal numbering rule. Area 400 is divided into four quadrants 402, 404, 406, and 408. The (y, x) coordinates for quadrant 402 are (0, 0)=0 indicating quadrant zero. The (y, x) coordinates for quadrant 404 are (0, 1)=1 indicating quadrant one. The (y, x) coordinates for quadrant 406 are (1, 0)=2 indicating quadrant two. The (y, x) coordinates for quadrant 408 are (1, 1)=3 indicating quadrant three.

The quad-tree indices (QTI) are organized in a machine-readable storage medium as a list (e.g., a linked list). The quad-tree indices are a set of files including an index file (e.g., index.qti) and a set of quad-tree index files (e.g., *.qti) named sequentially starting from 0.qti. The index.qti file includes the depth of the corresponding octree, a maximum resolved depth for the quad-tree indices, and an ordered list specifying each quad-tree index and the resolved depth of the each quad-tree index. One example of an index.qti file is provided below.

```
8 /* octree depth*/
3 /*maximum resolved depth*/
3, 3, 2, 1 /*the resolved depth for each *.qti file in sequential order*/
```

In this example, there are three *.qti files including 0.qti having a resolved depth of three, 1.qti having a resolved depth of three, 2.qti having a resolved depth of two, and 3.qti having a resolved depth of one.

The maximum resolved depth (MRD) may be a user input. The maximum resolved depth is a variable that tunes a tradeoff between the storage (e.g., QTI file sizes) and the runtime computing (e.g., slicing) speed. If the maximum resolved depth equals zero, the assistance of the quad-tree indices is effectively turned off and the QTI file size is near zero. In this case, accessing a voxel during runtime will require walking the octree. If the maximum resolved depth equals the octree depth, the QTI file sizes are larger and the QTI files effectively resolve the entire octree maximizing runtime computing (e.g., slicing) speed. In this case, random access of voxels during runtime with constant cost is effectively enabled.

Each *.qti file is used to write a z-slice of varying thickness of the octree. The thickness of each *.qti file is determined by the resolved depth of the *.qti file. In a computer readable storage medium, a *.qti file may be a node of a linked list, defined as:

```
Class QTI /*z-slice of the octree*/ {
    QTI*prev;
    QTI*next; /*linked list*/
    Int CRD; /*current resolved depth*/
    Boolean isFullyresolved;
    tuple_list [(depth, offset, NLN) ...];
}
```

The above linked list class may be used to create the QTI files and deleted once the QTI files are created. Therefore, once created, the QTI files may be a list of files rather than a linked list. Each tuple indexes a corresponding node of the octree and includes a corresponding depth of the octree, an offset indicating the location of the corresponding node in the octree at the corresponding depth, and a NLN flag indicating whether the corresponding node is a non-leaf node (i.e., not fully resolved) or a leaf node (i.e., fully resolved). The tuple list is ordered as follows: 1) within the same depth array, each node has four siblings, which are placed together and sequentially following the quaternary nodal numbering rule; and 2) a non-leaf node is replaced by its children nodes in place.

Figure 4B:
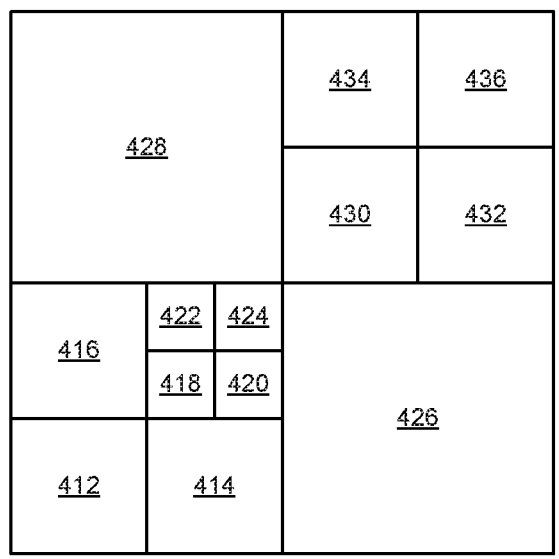
FIG. 4B is a diagram illustrating one example of the mapping of a quad-tree index to a quad-tree.

FIG. 4B is a diagram illustrating one example of the mapping of a quad-tree index (*.qti file) to a quad-tree. The example *.qti mapped in FIG. 4B is provided below.

```
3 /*resolved depth*/
{
    (2, 0, T) /*indicated at 412*/
    (2, 1, T) /*indicated at 414*/
    (2, 2, T) /*indicated at 416*/
        (3, 0, T) (3, 1, T) (3, 2, T) (3, 3, T) /*indicated at 418, 420,
            422, and 424, respectively*/
} /*first quadrant (0, 0) = 0*/
(1, 1, T) /*second quadrant (0, 1) = 1, indicated at 426*/
(1, 2, T) /*third quadrant (1, 0) = 2, indicated at 428*/
{
    (2, 8, T) /*indicated at 430*/
    (2, 9, T) /*indicated at 432*/
    (2, 10, T) /*indicated at 434*/
    (2, 11, T) /*indicated at 436*/
} /*fourth quadrant (1, 1) = 3*/
```

The brackets and indentations in the above example are included for improved readability and are not required for the *.qti file. The same quad-tree may be resolved at different depths For example, the above quad-tree may be resolved to depth 1: "1, (1, 0, F) (1, 1, T) (1, 2, T) (1, 3, F)" or depth 2: "2, (2, 0, T) (2, 1, T) (2, 2, T) (2, 3, F) (1, 1, T) (1, 2, T) (2, 8, T) (2, 9, T) (2, 10, T), (2, 11, T)".

Figure 5:
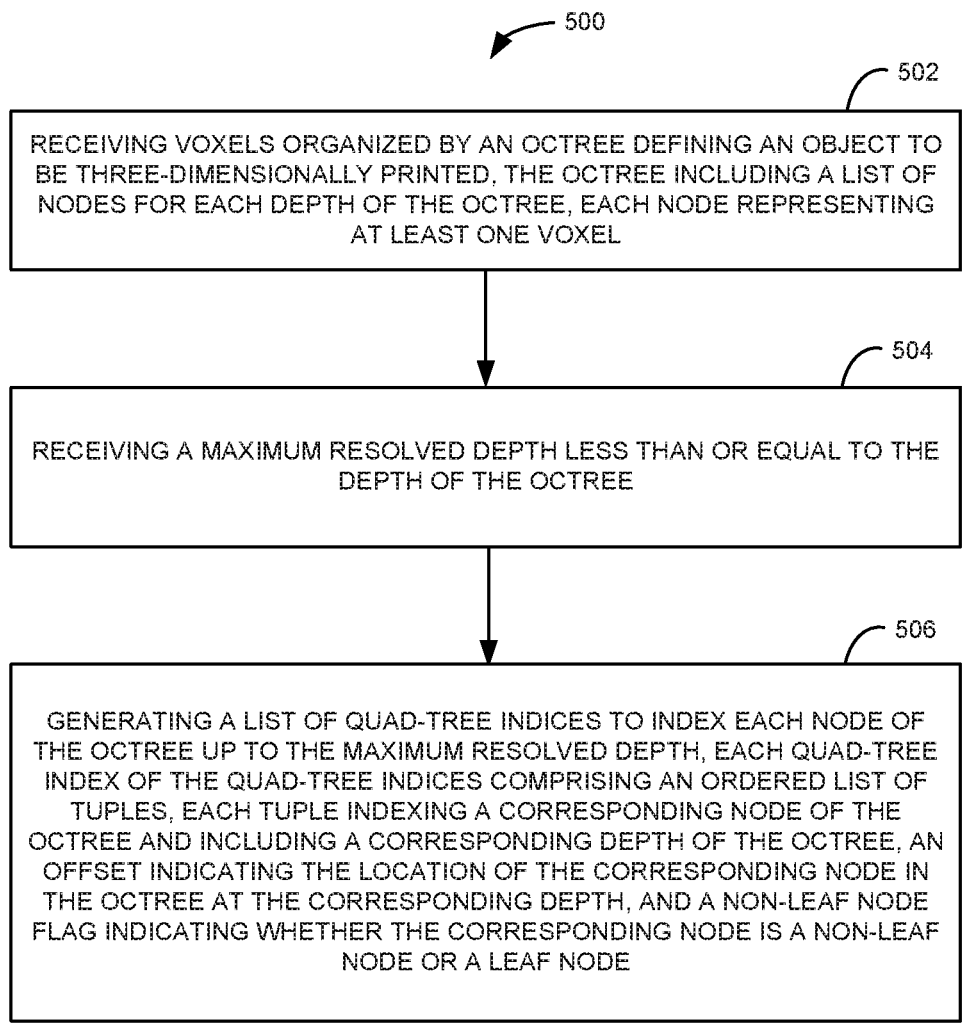
FIG. 5 is a flow diagram illustrating one example of a method to generate quad-tree indices for an octree.

FIG. 5 is a flow diagram illustrating one example of a method 500 to generate quad-tree indices for an octree. In one example, method 500 is performed by a processor, such as processor 102 previously described and illustrated with reference to FIG. 1. At 502, method 500 includes receiving an octree defining an object to be three-dimensionally printed, the octree including a list of nodes for each depth of the octree. At 504, method 500 includes receiving a maximum resolved depth less than or equal to the depth of the octree. At 506, method 500 includes generating a list of quad-tree indices to index each node of the octree up to the maximum resolved depth, each quad-tree index of the quad-tree indices comprising an ordered list of tuples, each tuple indexing a corresponding node of the octree and including a corresponding depth of the octree, an offset indicating the location of the corresponding node in the octree at the corresponding depth, and a non-leaf node flag indicating whether the corresponding node is a non-leaf node or a leaf node.

Method 500 may further include generating an index for the list of quad-tree indices, the index comprising the depth of the octree, the maximum resolved depth, and an ordered list specifying each quad-tree index and the resolved depth of each quad-tree index. The greater the maximum resolved depth, the greater the size of the list of quad-tree indices and the lower the runtime latency when the list of quad-tree indices is accessed to 3D print the object.

Figure 6:
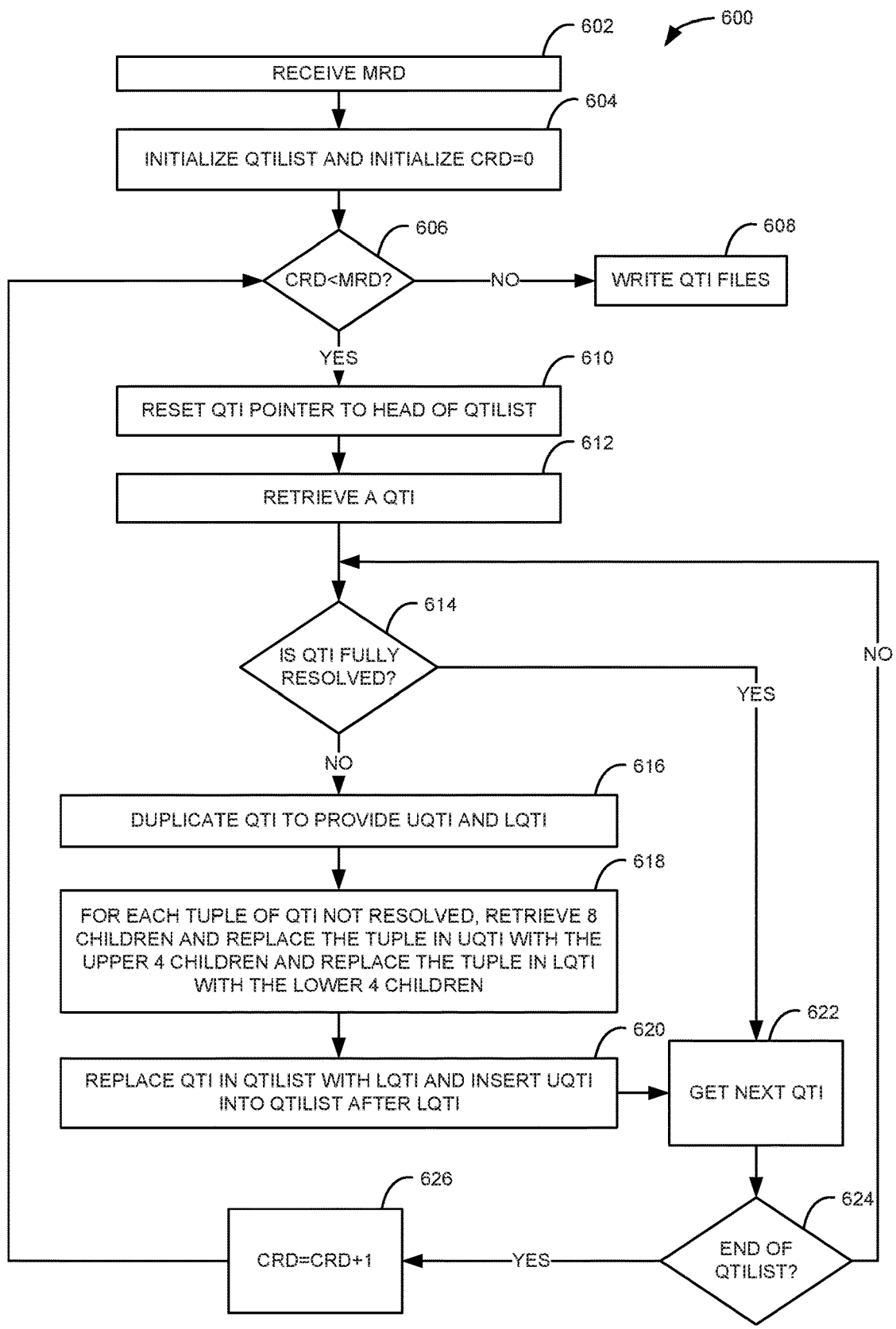
FIG. 6 is a flow diagram illustrating another example of a method to generate quad-tree indices for an octree.

FIG. 6 is a flow diagram illustrating another example of a method 600 to generate quad-tree indices for an octree. In one example, method 600 is performed by a processor, such as processor 102 previously described and illustrated with reference to FIG. 1. At 602, a maximum resolved depth (MRD) is received. MRD is an integer less than or equal to the depth of the octree. At 604, a linked list (QTILIST) of quad-tree indices is initialized and a current resolved depth (CRD) is initialized to zero. At 606, method 600 determines whether CRD is less than MRD.

If CRD is less than MRD, then at 610 a QTI pointer is reset to the head of the QTILIST. At 612, a QTI is retrieved based on the QTI pointer. At 614, method 600 determines whether the QTI is fully resolved. In one example, determining whether the QTI if fully resolved includes reading the isFullyresolved Boolean value for the QTI. If the QTI is not fully resolved, then at 616, the QTI is duplicated to provide an upper QTI (UQTI) and a lower QTI (LQTI). At 618, the tuples of the QTI are scanned and for each tuple of the QTI that is not resolved, eight children are retrieved and the tuple in the UQTI is replaced with four tuples corresponding to the upper four children and the tuple in the LQTI is replaced with four tuples corresponding to the lower four children. At 620, the QTI in QTILIST is replaced with the LQTI and the UQTI is inserted into the QTILIST after the LQTI.

If the QTI is fully resolved at 614 or after block 620, at 622 the next QTI in the QTILIST is retrieved. At 624, method 600 determines whether the end of the QTILIST has been reached. If the end of the QTILIST has not been reached, then method 600 returns to decision block 614 and the process continues. If the end of the QTILIST has been reached, then at 626 CRD is set equal to CRD plus one (i.e., incremented) and method 600 returns to decision block 606 and the process continues. If CRD is not less than MRD at 606, then at 608 the QTI files are written since the QTILIST is completed up to the MRD. The index.qti file is generated and each *.qti file is written by walking the QTILIST.

The following figures describe the runtime operation using the octree and quad-tree indices for 3D printing of an object. The resolution of the octree and quad-tree indices are hardware (e.g., printer) independent. During runtime, the octree and quad-tree indices are loaded into memory to produce slices (e.g., images with material assignment per pixel) to provide to a printer for printing. At this time, the hardware characteristics may be addressed including additional 3D computation to compensate for process physics and/or the hardware resolution (e.g., printing resolution).

Prior to printing, the OCT file is loaded into memory. The OCT file is scanned and the header section is read to allocate memory for the list of node lists (per depth). The nodes are then read from the OCT file per depth starting from the root depth and the node content is filled accordingly. For each depth, a non-leaf node counter (NLNC) is initiated to zero. When a leaf-node is encountered, the payload for the node is filled with the content from the OCT file. When a non-leaf node is encountered, the payload for the node is set to NLNC*8, which indicates that the children for the node are in the next depth starting position from NLNC to NLNC+8. NLNC is incremented by one for each non-leaf node. In this way, the octree is recreated in memory. The compute time is linear to the node count and for each node the compute time is small (i.e., largely reading from the OCT file).

Additional 3D computations may be used to generate auxiliary data to support and/or to compensate for printing physics. For example, in multi-jet fusion printers thermal diffusion is an effect that may be compensated for by active management for geometry fidelity (e.g., sharp corners). Preserving the octree in memory enables this type of computation since the new nodal values are stored in the octree. The quad-tree indices are assistive indices that accelerate nodal content retrieval from the octree.

Figure 7:
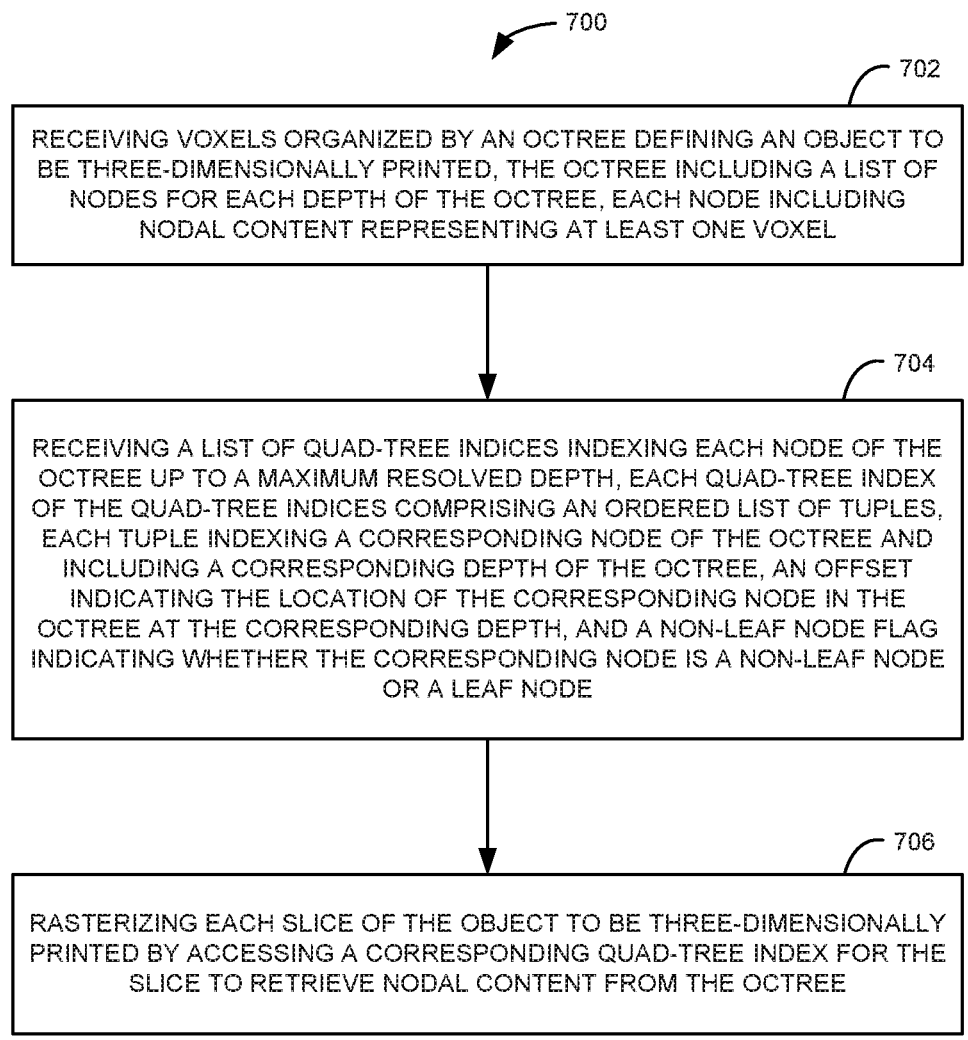
FIG. 7 is a flow diagram illustrating one example of a method to process an object for three-dimensional printing.

FIG. 7 is a flow diagram illustrating one example of a method 700 to process an object for 3D printing. In one example, method 700 is performed by a processor, such as processor 102 previously described and illustrated with reference to FIG. 1. At 702, method 700 includes receiving an octree defining an object to be three-dimensionally printed, the octree including a list of nodes for each depth of the octree, each node including nodal content. At 704, method 700 includes receiving a list of quad-tree indices indexing each node of the octree up to a maximum resolved depth, each quad-tree index of the quad-tree indices comprising an ordered list of tuples, each tuple indexing a corresponding node of the octree and including a corresponding depth of the octree, an offset indicating the location of the corresponding node in the octree at the corresponding depth, and a non-leaf node flag indicating whether the corresponding node is a non-leaf node or a leaf node. At 706, method 700 includes rasterizing each slice of the object to be three-dimensionally printed by accessing a corresponding quad-tree index for the slice to retrieve nodal content from the octree.

Method 700 may further include determining normalized z-coordinates for each quad-tree index between zmin and zmax and slicing sequentially from zmin to zmax based on a thickness for each slice to identify each slice prior to rasterizing. The nodal content of the octree may be modified based on the characteristics of a specified three-dimensional printer prior to rasterizing each slice (e.g., to compensate for thermal diffusion effects).

Figure 8:
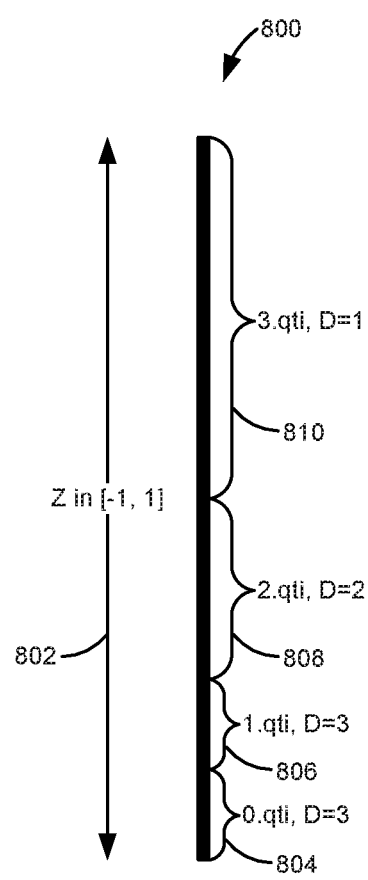
FIG. 8 is a diagram illustrating one example of normalized Z-coordinates indicating which z-slices of an object are defined by each quad-tree index.

FIG. 8 is a diagram illustrating one example of normalized z-coordinates indicating which z-slices of an object 800 are defined by each quad-tree index. The index.qti file is loaded into memory and based on the depth list, a qti_marker[ ], which are the normalized z-coordinates for each QTI slice are computed. The qti_marker[ ] is used to select the correct QTI file for each slice. The z-coordinates for the object are normalized between −1 and 1 as indicated at 802. The z-resolution (ZREs) is based on the maximum resolved depth (MRD) and is calculated as follows:

$$Z_{RES} = \frac{1}{2^{MRD}}$$

For example, for a maximum resolved depth of three for the example of FIG. 8, the z-resolution is ⅛. The qti_marker for each QTI is determined as follows:

```
qti_marker[ ] = NULL;
marker = −1; /*normalized zmin for octree*/
for (depth in depth_list):
    thickness = 2.0/(2^{depth})
    marker += thickness
    qti_marker.append(marker)
```

In the example of FIG. 8, therefore, 0.qti as indicated at 804 having a depth of 3 extends between −1 and −0.75; 1.qti as indicated at 806 having a depth of 3 extends between −0.75 and −0.50; 2.qti as indicated at 808 having a depth of 2 extends between −0.50 and 0; and 3.qti as indicated at 810 having a depth of 1 extends between 0 and 1. Thus, qti_marker[ ] is qti_marker[−0.75, −0.50, 0, 1] in this example.

Figure 9:
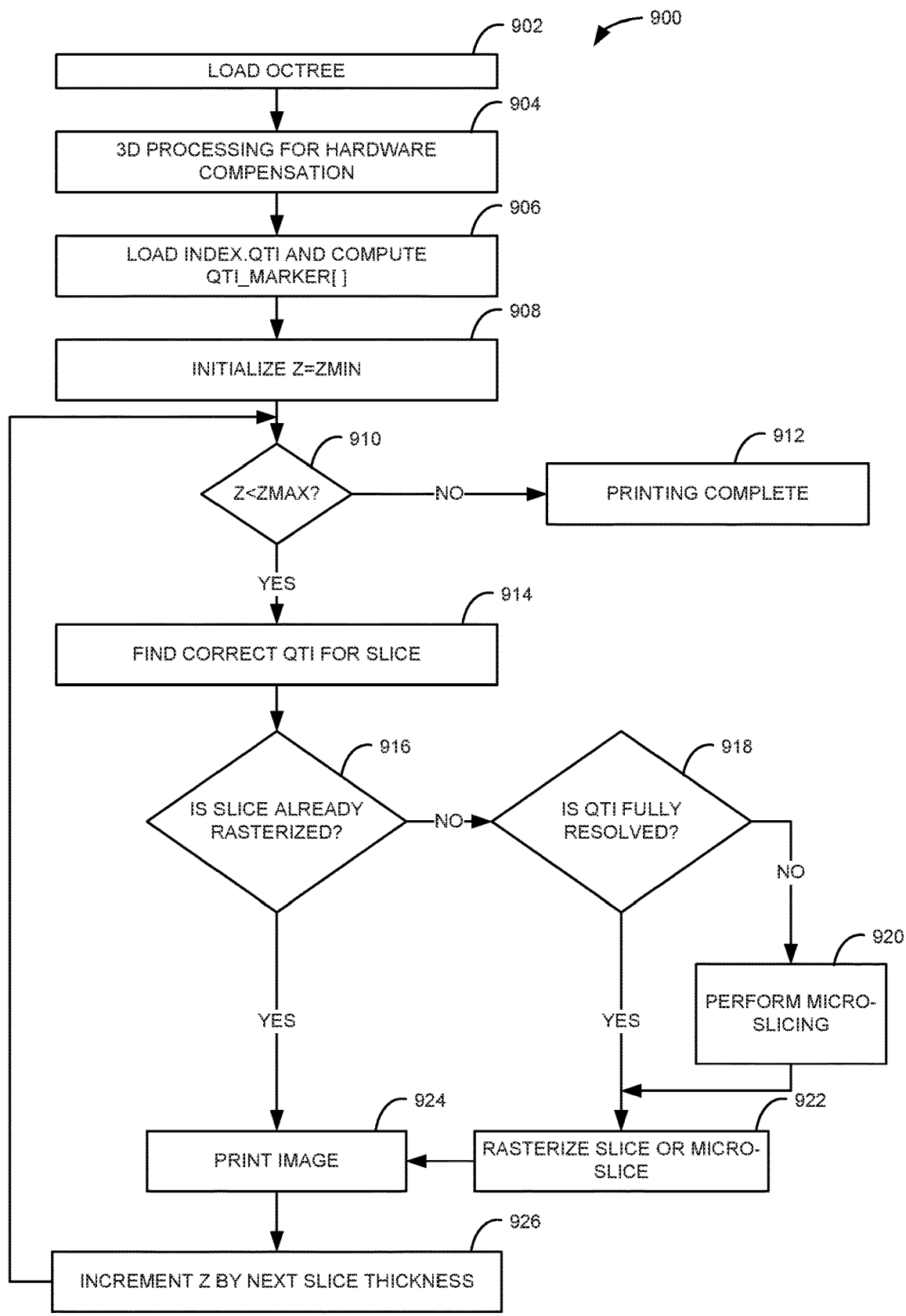
FIG. 9 is a flow diagram illustrating another example of a method to process an object for three-dimensional printing.

FIG. 9 is a flow diagram illustrating another example of a method 900 to process an object for 3D printing. In one example, method 900 is performed by a processor, such as processor 102 previously described and illustrated with reference to FIG. 1. At 902, the octree defining the object to be 3D printed is loaded and reconstructed in memory. At 904, 3D processing for hardware compensation is performed. At 906, the index.qti file is loaded and the qti_marker[ ] is computed. At 908, z is initialized to zmin (i.e., −1). At 910, method 900 determines whether z is less the zmax (i.e., 1). If z is less than zmax, then at 914 the correct QTI for the slice is found based on the qti_marker[ ]. At 916, method 900 determines whether the slice has already been rasterized. If the slice has not already been rasterized, then at 918 method 900 determines whether the QTI is fully resolved. If the QTI is not fully resolved, then at 920 micro-slicing is performed to fully resolve the QTI. Micro-slicing is further described below with reference to FIG. 12. If the QTI is fully resolved at 918 or after performing micro-slicing at 920, the slice or micro-slice is rasterized at 922. Rasterizing the QTI is further described below with reference to FIGS. 10 and 11. If the slice is already rasterized at 916 or after rasterizing the slice or micro-slice at 922, the image is printed at 924. At 926, z is incremented by the next slice thickness and the process returns to decision block 910. An external program may set the thickness for each slice. The thickness for each slice may be a constant (e.g., 100 µm) or may be different for different slices. If z is not less than zmax at 910, then at 912 the printing of the object is complete.

Figure 10:
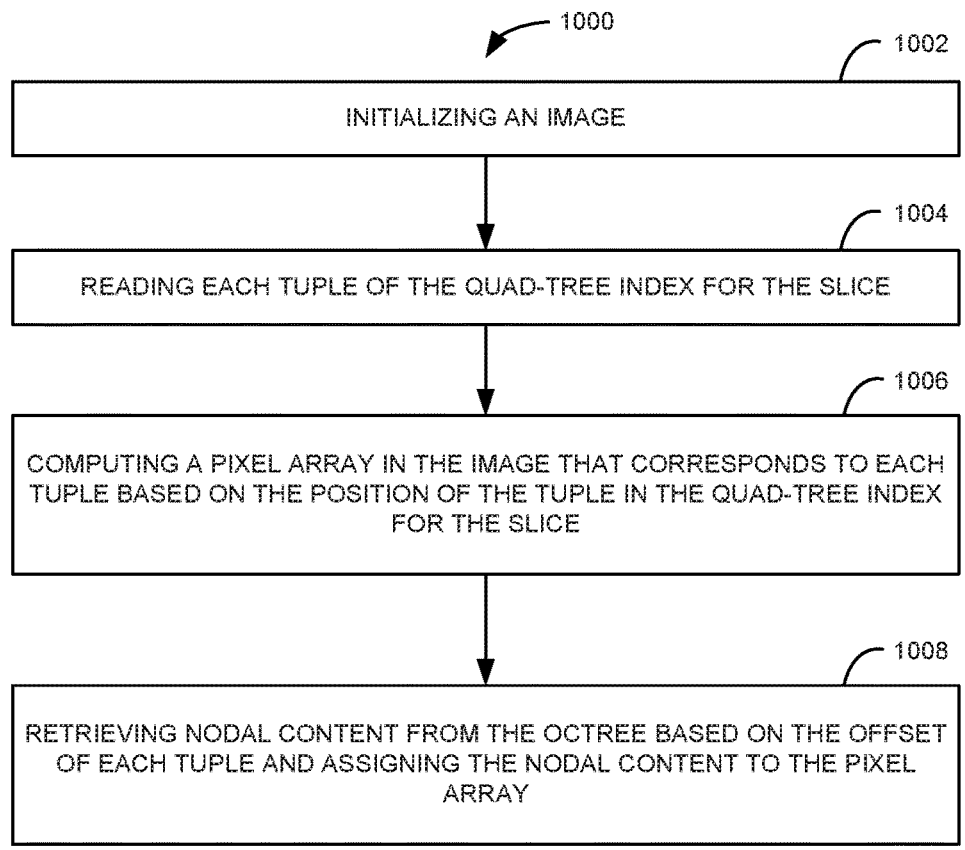
FIG. 10 is a flow diagram illustrating one example of a method to prepare an image for printing.

FIG. 10 is a flow diagram illustrating one example of a method 1000 to prepare an image (i.e., slice) for printing. Method 1000 is performed by a processor, such as processor 102 previously described and illustrated with reference to FIG. 1. At 1002, method 1000 includes initializing an image. In one example, the image is initialized to an N×N image where "N" is a suitable value indicating the length of one side of the image. The initializing of the image may be based on polygon boundaries obtained via vector slices. At 1004, method 1000 includes reading each tuple of the quad-tree index for the slice. At 1006, method 1000 includes computing a pixel array in the image that corresponds to each tuple based on the position of the tuple in the quad-tree index for the slice. At 1008, method 1000 includes retrieving nodal content from the octree based on the offset of each tuple and assigning the nodal content to the pixel array. The nodal content may include the material composition. After scanning all tuples in the quad-tree index, the content composition for the image, and thus the slicing operation, is complete.

Figure 11:
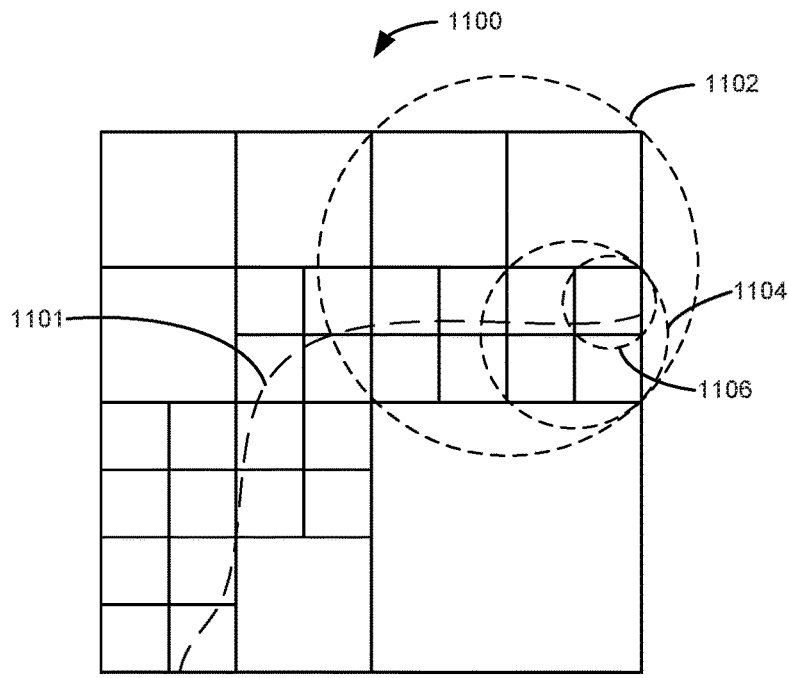
FIG. 11 is a diagram illustrating one example of an image to be printed.

FIG. 11 is a diagram illustrating one example of an image 1100 to be printed, which is generated by rasterizing the QTI for a slice. In this example, image 1100 defines a slice of an object having a border indicated at 1101. The slice is partitioned into two-dimensional (2D) tiles based on the resolved depth (i.e., a 2D array of $[2^{resolved\_depth}, 2^{resolved\_depth}]$). In the example of FIG. 11, where the resolved depth is three, the slice is partitioned into 8×8 tiles. Each tuple (depth, offset) corresponds to a unique set of tiles. An address index (addr) is used to compute the tuple-tile mapping as follows:

```
addr = 0
for (int i=0; i < tuple_list.size( ); i++) {
    addr_of_this_tuple = addr
    addr = addr + 4^(this_tuple_depth − resolved_depth)
    /*quaternary numbering*/
}
```

The addr compute may happen while scanning the tuple list. For a given tuple, the addr of the tuple may be written as sum(ai*$4^{(resolved\_depth-i-1)}$) or [a_0, a_1, a_2]*[$4^{(3-0-1)}$, $4^1$, $4^0$], i=0, 1, . . . (resolved_depth-1), ai=0, 1, 2, or 3. Integer ai is further mapped to a tuple of (0, 0), (1, 0), (0, 1), (1, 1) denoted as (ai[0], ai[1]) where [0] corresponds to the x index and [1] corresponds to the y index.

An addr can translate a list of ai[0] (x-index array) (in this example (a_0[0], a_1[0], a_2[0])) and ai[1] (y-index array) (in this example (a_0[1], a_1[1], a_2[1])) as indicated at 1102, 1104, and 1106, respectively. Therefore:

$$x\text{-addr} = \text{sum} ( a\_i[0] * 2^{(resolved\_depth - i - 1)} )$$
$$y\text{-addr} = \text{sum} ( a\_i[1] * 2^{(resolved\_depth - i - 1)} )$$

The linear coverage of each tuple is determined by the depth of the tuple, $2^{(this\_tuple\_depth - resolved\_depth)}$. The tiles covered by each tuple is between [x-addr, y-addr] and [x-addr+linear_coverage, y-addr+linear_coverage]. To map to the N×N sliced image, each tuple corresponds to the pixel array between (int(float(x-addr)/($2^{resolved\_depth}$)*N, int(float (y-addr)/($2^{resolved\_depth}$)*N)) and (int(float(x-addr+linear_coverage)/($2^{resolved\_depth}$)*N, int(float(y-addr+linear_coverage)/($2^{resolved\_depth}$)*N)).

Based on the offset and depth value of each tuple, the octree node corresponding to the tuple may be directly accessed to retrieve the nodal content. If the content (e.g., material ID and/or distribution) is uniform, all pixels in the pixel array are assigned the same value. If sub-node resolution is enabled (e.g., multiple materials reside at different portions of the same node), different pixels with different values may be assigned based on the nodal content (e.g., via interpolation schemes).

A voxel-based data structure may not be body-fitted. The voxel cubes may not align with complex shape boundaries. Therefore, the resulting slices may have shape error where the size of this error is about the size of a voxel at the boundary. To overcome this, vector slicing may be implemented as part of the rasterization. A very efficient vector slicer can handle 20 million or more triangles and generate a slice in approximately 100 milliseconds.

The vector slicer is used to generate the slices in the form of boundary polygons. The boundary polygons are body fitted and have zero slicing induced shape error (as opposed to voxel slicing with slicing induced shape error of voxel size). The boundary polygons are used to generate image pixels for the boundaries.

The boundary pixels on the slices obtain the material properties through voxels. For each boundary pixel, the region of influence (ROI) is identified, which may cover multiple voxels. The value assigned to the pixel is the weighted-average of the values carried by the voxels within the ROI. The weight is the inverse of the distance from the voxel center to the pixel.

Figure 12:
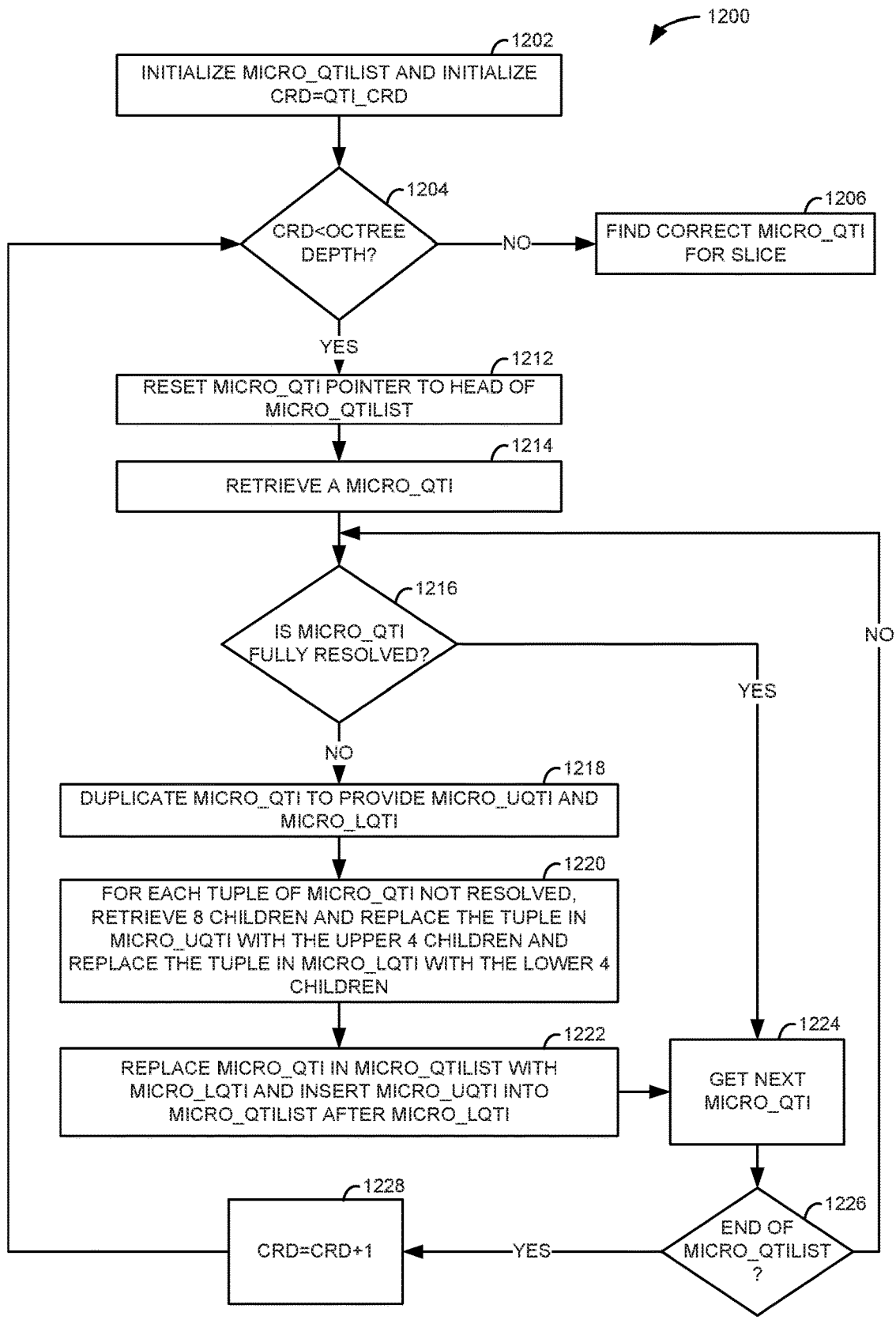
FIG. 12 is a flow diagram illustrating one example of a method to perform the micro-slicing of FIG. 9.

FIG. 12 is a flow diagram illustrating one example of a method 1200 to perform the micro-slicing of block 920 of FIG. 9. In one example, method 1200 is performed by a processor, such as processor 102 previously described and illustrated with reference to FIG. 1. At 1202, a linked list (MICRO_QTILIST) of quad-tree indices is initialized and the current resolved depth (CRD) is initialized to the CRD of the current QTI (QTI_CRD). At 1204, method 1200 determines whether CRD is less than the octree depth.

If CRD is less than the octree depth, then at 1212, a MICRO_QTI pointer is reset to the head of the MICRO_QTILIST. At 1214, a MICRO_QTI is retrieved based on the MICRO_QTI pointer. At 1216, method 1200 determines whether the MICRO_QTI if fully resolved. If the MICRO_QTI is not fully resolved, then at 1218, the MICRO_QTI is duplicated to provide an upper MICRO_QTI (MICRO_UQTI) and a lower MICRO_QTI (MICRO_LQTI). At 1220, the tuples of the MICRO_QTI are scanned and for each tuple of the MICRO_QTI that is not resolved, eight children are retrieved and the tuple in the MICRO_UQTI is replaced with four tuples corresponding to the upper four children and the tuple in the MICRO_LQTI is replaced with four tuples corresponding to the lower four children. At 1222, the MICRO_QTI in the MICRO_QTILIST is replaced with the MICRO_LQTI and the MICRO_UQTI is inserted into the MICRO_QTILIST after the MICRO_LQTI.

If the MIRCRO_QTI is fully resolved at 1216 or after block 1222, at 1224 the next MICRO_QTI in the MICRO_QTILIST is retrieved. At 1226, method 1200 determines whether the end of the MICRO_QTILIST has been reached. If the end of the MICRO_QTILIST has not been reached, then method 1200 returns to decision block 1216 and the process continues. If the end of the MICRO_QTILIST has been reached, then at 1228 CRD is set equal to CRD plus one (i.e., incremented) and method 1200 returns to decision block 1204 and the process continues. If CRD is not less than the octree depth at 1204, then at 1206, the correct MICRO_QTI for the micro-slice is found. The micro-slice is then rasterized at block 922 as previously described and illustrated with reference to FIG. 9.

In summary, the *.qti that the slice plane intercepts is rasterized. The rasterized image is cached until the image is obsolete so that no *.qti is rasterized twice. In one example, to rasterize a *.qti, each pixel is visited only once and only relevant nodes are visited and visited only once. The MRD and micro-slicing add elasticity into the balancing between the OCT and QTI file size generated by the pre-print and the additional runtime overhead.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A non-transitory machine readable storage medium comprising:
   voxels organized by an octree defining an object to be three-dimensionally printed, the octree including a list of nodes for each depth of the octree including leaf nodes and non-leaf nodes, each node including nodal content representing at least one voxel;
   at least one quad-tree index to index at least one node of the octree having a depth less than or equal to a maximum resolved depth, each quad-tree index of the at least one quad-tree index corresponding to a slice of the object to be three-dimensionally printed, wherein the slice corresponds to a layer of the object to be three-dimensionally printed, wherein the at least one quad-tree index is to be accessed by computer executable instructions to retrieve nodal content from the octree to control a processor to process the layer of the object to be three-dimensionally printed;
   wherein the at least one quad-tree index comprises an ordered list of tuples, wherein each tuple of the ordered list of tuples indexes a corresponding node of the octree, and wherein each tuple of the ordered list of tuples includes three separate and distinct elements including a corresponding depth of the octree, an offset indicating the location of the corresponding node in the octree at the corresponding depth, and a non-leaf node flag indicating whether the corresponding node is a non-leaf node or a leaf node;
   modifying the nodal content of the octree based on characteristics of a specified three-dimensional printer prior to rasterizing each slice; and
   wherein the nodal content for each leaf node indicates a material composition to form the at least one voxel represented by each leaf node.

2. The non-transitory machine readable storage medium of claim 1, wherein the at least one quad-tree index comprises a resolved depth of the at least one quad-tree index and a flag indicating whether the nodes indexed by the at least one quad-tree index are fully resolved.

3. The non-transitory machine readable storage medium of claim 1, further comprising:
   an index for the at least one quad-tree index, the index comprising the depth of the octree, the maximum resolved depth, and an ordered list specifying the at least one quad-tree index and the resolved depth of the at least one quad-tree index.

4. The non-transitory machine readable storage medium of claim 1, wherein the octree is a human readable and editable serial data file, and
   wherein the at least one quad-tree index is a human readable and editable serial data file.

5. A method to generate quad-tree indices for an octree, the method comprising;
   receiving, via a processor, voxels organized by an octree defining an object to be three-dimensionally printed, the octree including a list of nodes for each depth of the octree, each node including nodal content representing at least one voxel;
   receiving, via the processor, a maximum resolved depth less than or equal to the depth of the octree; and
   generating, via the processor, a list of quad-tree indices to index each node of the octree up to the maximum resolved depth, each quad-tree index of the quad-tree indices comprising an ordered list of tuples and corresponding to a layer of the object to the three-dimensionally printed, wherein each tuple of the ordered list of tuples indexes a corresponding node of the octree, wherein each tuple of the ordered list of tuples includes a corresponding depth of the octree, an offset indicating the location of the corresponding node in the octree at the corresponding depth, and a non-leaf node flag indicating whether the corresponding node is a non-leaf node or a leaf node;
   modifying the nodal content of the octree based on characteristics of a specified three-dimensional printer prior to the rasterizing each slice; and
   wherein the nodal content for each leaf node indicates a material composition to form the at least one voxel represented by each leaf node.

6. The method of claim 5, wherein generating the list of quad-tree indices comprises:
   initializing a linked list of quad-tree indices and initializing a current depth to zero;
   iterating the linked list of quad-tree indices until a current depth equals the maximum resolved depth;
   for each quad-tree index of the quad-tree indices, determining whether the quad-tree index is fully resolved;
   in response to determining that a quad-tree index is not fully resolved, dividing the quad-tree index into two quad-tree indices and updating each of the two quad-tree indices for the current depth to further resolve each of the two quad-tree indices;

in response to determining that the quad-tree index is fully resolved, moving to the next quad-tree index in the linked list of quad-tree indices; and in response to reaching the end of the linked list of quad-tree indices, incrementing the current depth by one and repeating the iterating of the linked list of quad-tree indices until the current depth equals the maximum resolved depth.

7. The method of claim 6, wherein dividing the quad-tree index into two quad-tree indices and updating each of the two quad-tree indices for the current depth comprises:

duplicating the quad-tree index to provide an upper quad-tree index and a lower quad-tree index;

scanning each tuple of the quad-tree index;

for each tuple indicating a non-leaf node, retrieving eight of the children of the non-leaf node and replacing the tuple in the lower quad-tree index with tuples corresponding to the lower four children and replacing the tuple in the upper quad-tree index with tuples corresponding to the upper four children; and replacing the quad-tree index with the lower quad-tree index and inserting the upper quad-tree index into the linked list of quad-tree indices after the lower quad-tree index.

8. The method of claim 6, further comprising:

generating an index for the list of quad-tree indices, the index comprising the depth of the octree, the maximum resolved depth, and an ordered list specifying each quad-tree index and the resolved depth of each quad-tree index.

9. The method of claim 6, wherein the greater the maximum resolved depth, the greater the size of the list of quad-tree indices and the lower the runtime latency when the list of quad-tree indices is accessed to three-dimensionally print the object.

10. A method to process an object for three-dimensional printing, the method comprising;

receiving, via a processor, voxels organized by an octree defining an object to be three-dimensionally printed, the octree including a list of nodes for each depth of the octree, each node including nodal content representing at least one voxel;

receiving, via the processor, a list of quad-tree indices indexing each node of the octree up to a maximum resolved depth, each quad-tree index of the quad-tree indices comprising an ordered list of tuples, wherein each tuple of the ordered list of tuples indexes a corresponding node of the octree, and wherein each tuple of the ordered list of tuples includes a corresponding depth of the octree, an offset indicating the location of the corresponding node in the octree at the corresponding depth, and a non-leaf node flag indicating whether the corresponding node is a non-leaf node or a leaf node;

modifying the nodal content of the octree based on characteristics of a specified three-dimensional printer prior to rasterizing each slice;

wherein the nodal content for each leaf node indicates a material composition to form the at least one voxel represented by each leaf node; and rasterizing, via the processor, each slice of the object to be three-dimensionally printed by accessing a corresponding quad-tree index for the slice to retrieve nodal content from the octree, wherein each slice of the object to the three-dimensionally printed corresponds to a layer of the object to be three-dimensionally printed.

11. The method of claim 10, wherein rasterizing each slice of the object to be three-dimensionally printed comprises:

determining whether the quad-tree index for the slice is fully resolved;

in response to determining the quad-tree index for the slice is fully resolved, rasterizing the slice;

in response to determining the quad-tree index for the slice is not fully resolved, fully resolving the quad-tree index prior to rasterizing the slice.

12. The method of claim 11, wherein rasterizing each slice of the object to be three-dimensionally printed comprises:

initializing an image based on polygon boundaries obtained via vector slices;

reading each tuple of the quad-tree index for the slice;

computing a pixel array in the image that corresponds to each tuple based on the position of the tuple in the quad-tree index for the slice; and retrieving nodal content from the octree based on the offset of each tuple and assigning the nodal content to the pixel array.

13. The method of claim 11, further comprising:

determining normalized z-coordinates for each quad-tree index between zmin and zmax; and slicing sequentially from zmin to zmax based on a thickness for each slice to identify each slice prior to rasterizing.

14. The non-transitory machine readable storage medium of claim 1, wherein the at least one quad-tree index is to be accessed by computer executable instructions to directly retrieve nodal content from the octree based on the offset and depth value of each tuple.

15. The non-transitory machine readable storage medium of claim 1, wherein the offset of each tuple is based on a quaternary nodal numbering rule.

16. The method of claim 6, wherein the offset of each tuple is based on a quaternary nodal numbering rule.

17. The method of claim 11, wherein rasterizing each slice of the object to be three-dimensionally printed comprises accessing the corresponding quad-tree index for the slice to directly retrieve nodal content from the octree based on the offset and depth value of each tuple.

18. The method of claim 11, wherein the offset of each tuple is based on a quaternary nodal numbering rule.

* * * * *